July 18, 1967  E. E. LINDSEY  3,331,691
PARTIALLY FROZEN CONFECTION
Filed Feb. 8, 1963  2 Sheets-Sheet 1
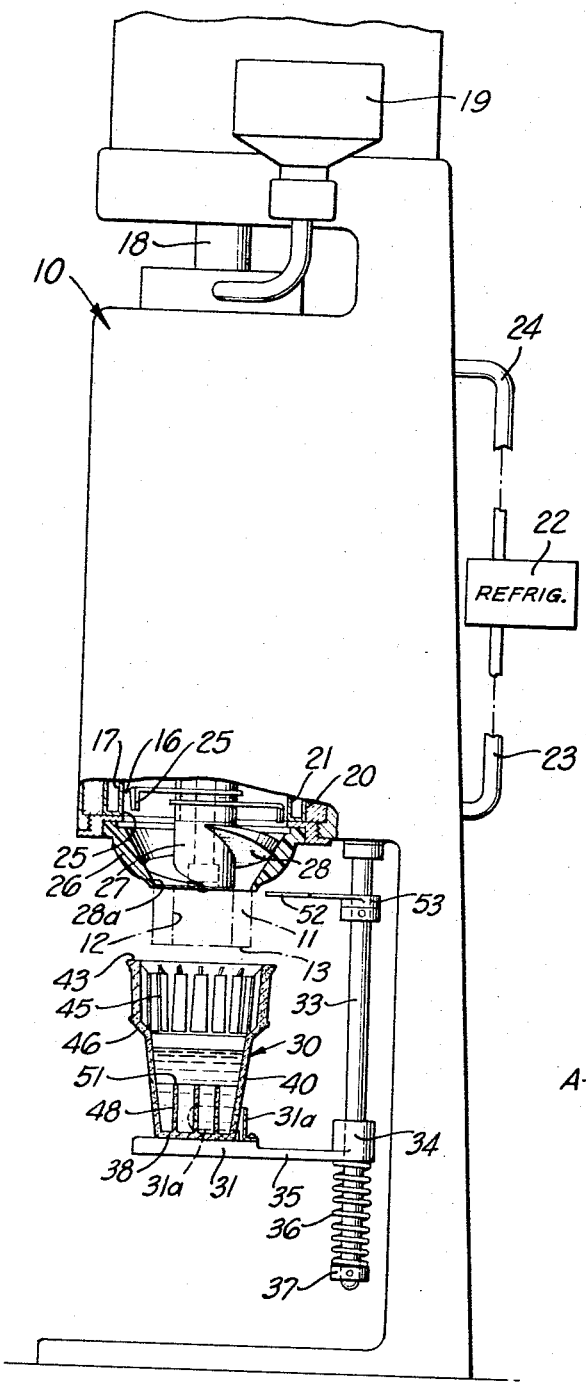
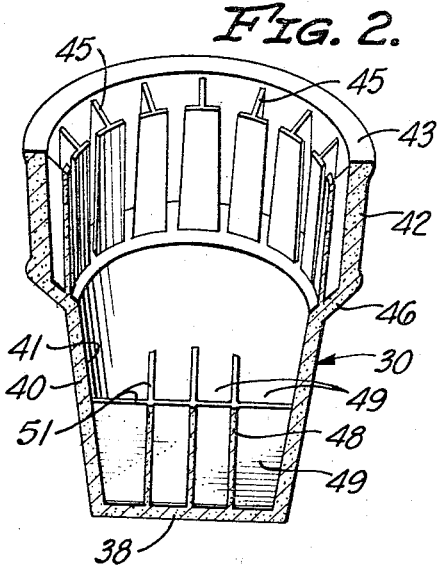
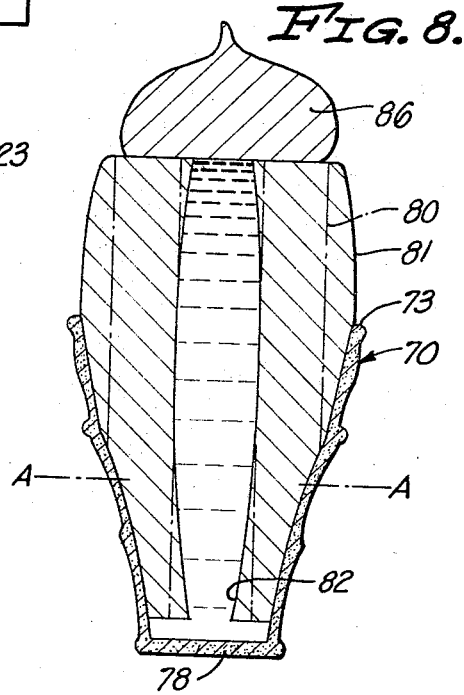
INVENTOR.
ERNEST E. LINDSEY
BY HIS ATTORNEYS
HARRIS, KIECH, RUSSELL & KERN July 18, 1967     E. E. LINDSEY     3,331,691

PARTIALLY FROZEN CONFECTION

Filed Feb. 8, 1963     2 Sheets-Sheet 2

INVENTOR.
ERNEST E. LINDSEY
BY HIS ATTORNEYS
HARRIS, KIECH, RUSSELL & KERN

United States Patent Office 3,331,691
Patented July 18, 1967

---

3,331,691
PARTIALLY FROZEN CONFECTION
Ernest E. Lindsey, 4114 Leimert Blvd.,
Los Angeles, Calif. 90008
Filed Feb. 8, 1963, Ser. No. 257,247
6 Claims. (Cl. 99—137)

My invention relates to confection products and to methods and apparatus for making them. These confections are of the cup-retained frozen type that may be eaten like an ice-cream cone.

It is an object of the invention to provide a frozen confection in which a sheath or annular column of frozen material rises from a cup, the frozen material providing a central space that is filled with an unfrozen material, usually of different flavor than the frozen material. A person consuming the confection from the top thus receives portions of frozen and unfrozen material in sundae-like fashion.

Another object of the invention is to provide a confection in which a small quantity of the unfrozen core material is present in the bottom of the cup. The bottom of the annular column of frozen material is in pressural contact with this unfrozen material as a result of the manner in which the confection is made, as will be described. If this cup is made of edible material the last portion of the confection to be consumed may be some of the cup material flavored by the unfrozen material in the bottom of the cup or portions of the frozen and unfrozen material with the latter in greater abundance. The unfrozen portion in the bottom of the cup will thus be a taste-lingering portion distinctively flavored with the residual unfrozen material or a fruit morsel if this has been placed in the bottom of the cup before placement of the frozen material.

One of the objects of the invention is to provide a delicious "last bite" and assure that all of the edible container be eaten and none thrown away to dirty up counters, floors or walks in the vicinity in which the confection is eaten.

A further object is to provide a confection in which the small quantity of unfrozen material is in the bottom of the cup in pockets formed between upstanding partitions, the annular frozen material extending downward substantially to the tops of such partitions.

A further object of the invention is to provide a machine and novel method of making such a confection. In this connection the invention comprises a confection made by the use of a machine or method in which an annular mass of frozen material is caused to enter and contact a pool of unfrozen material in the bottom of the cup or container to cause a portion of the unfrozen material to rise in a central space of the annular column forming a core therefor. This provides a confection in which the unfrozen material is in pressural contact with the bottom of the frozen material. It is an object of the invention to control the equipment or process so that the unfrozen material rises to a given level in this central space. According to the preferred practice of the invention it is an object to sever the annular mass substantially at this level. The upper portion of the core may thus be observed from the top of the confection thus formed. It is a further object of the invention to apply a cap or topping of the same or different unfrozen material or an edible morsel such as a nut meat, cherry or strawberry as a decorative and delectable crown for the confection if such is desired.

The outer diameter of the annular frozen mass is preferably such as to seal against the inner wall of the cup at or near the instant in which the lower annular end of the mass reaches the surface of the pool of unfrozen material. It is an object of the invention to control this outer dimension either by initial forming or as a result of compaction in the cup by the walls thereof. It is a further object of the invention to employ a frozen material of greater density than the unfrozen material. Relative liquidity of the two materials is a factor in such density and it is necessary that the frozen material of the annular mass should be of sufficient density relative to the lower density of the unfrozen material to increase the pressure in the bottom of the cup and thus cause the lighter material to rise into the core space.

Further objects and advantages of the invention will be apparent to those skilled in the art from the following description of exemplary embodiments of the confection, method and apparatus.

Referring to the drawings:

FIG. 1 is an elevational view, partially in section, illustrating somewhat diagrammatically equipment suitable for making the confection;

FIG. 2 is a sectional perspective view of the preferred cup of the confection;

FIG. 8 is a vertical sectional view of the confection when formed in a cup of different shape than the cup of FIG. 2.

Figure 3:
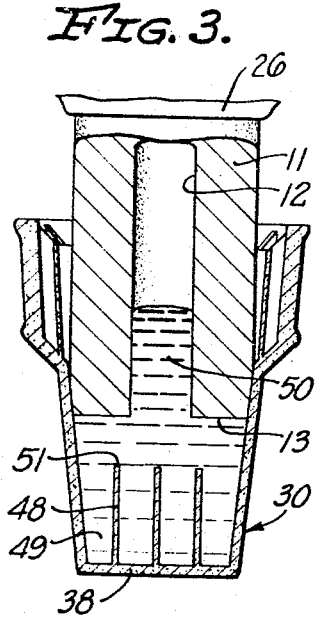
FIGS. 3, 4 and 5 represent sequential steps in the making of the confection.

Referring particularly to FIG. 1, the invention employs any suitable freezing means 10 capable of producing a downwardly-moving annular mass of frozen material 11 having a downwardly-open central space 12, the mass having an annular lower end 13 which may be smooth or somewhat irregular in shape. The freezing means 10 may take the form of any one of several freezing machines, preferably of the quick-freeze type designed to produce the annular mass 11. The machine shown in my Patent No. 3,029,615 can be employed using an adapter at the exit end as will be described. Such a machine may include a freezing chamber 16 formed within an upright freezing member 17. An inlet 18 at the top feeds the material to be frozen to the freezing chamber. This material may be of any flavor or a selected flavoring syrup may be added from a hopper 19.

A manifold 20 surrounds an outer wall 21 of the upright freezing member 17 to provide a manifold space through which a suitable refrigerant, such as brine, may be circulated as by use of refrigerating equipment 22 and inlet and outlet connections 23 and 24.

The material freezing on the inner wall of the upright freezing member 17 is continually scraped therefrom and compacted to form the annular mass of frozen material 11. This scraping can be effected by blades 25 throughout the height of the freezing chamber 17 turning upon one or more upright axes in such member to scrape the frozen material from the inner wall as it freezes thereon. A better annular mass of the frozen material will result from the machine of my prior patent if an adapter spout 26 is suitably clamped to the bottom of the machine. The central opening of this spout determines the outer diameter of the exuded annular mass while the hub of a helical-bladed drive element 27 determines the inner diameter. Such drive element may be attached to the lower end of a central shaft of the machine and its helical blade 28 turns in and conforms to the periphery of a frusto-conical passage 28a of the spout 26.

Any suitable cup 30 can be positioned manually or by the cup-holding means shown, the interior of the cup being in axial alignment with the lowering annular mass 11 from the freezing means 10. As diagrammatically shown, the cup-holding means includes a cup member 31 with a socket shaped to receive the cup 30 and a forwardly-open U-shaped spring clip 31a holding the cup against turning.

Means is provided for mounting the cup member 31 for vertical movement below the lower open end of the freezing chamber 16. Means is also provided for lowering the cup-receiving member 31 at a rate less than the rate of downward movement of the lower annular end 13 of the frozen annular mass 11. As diagrammatically shown in FIG. 1, such means may include a supporting post 33 slidably mounting a collar 34 formed at the end of an arm 35 of the cup-receiving member 31. The cup-receiving member 31 may be stationary or may be moved by any suitable mechanism to aid in the lowering of the cup at a controlled rate. A light spring 36 compressed between the sliding collar 34 and a stationary collar 37 at the bottom of the post 33 can be employed to control the lowering of the cup 30 as the annular mass of frozen material 11 enters it.

The preferred cup of the confection is shown in FIG. 2 and is obtainable as an article of commerce. It is made entirely of edible material similar to the material of which ice-cream cones are commonly made. It has an impervious bottom wall 38, an upwardly diverging side wall 40, which has an inner frusto-conical surface 41, and an outwardly-offset side wall 42 terminating in a lip 43. Molded within the side wall 42 is a plurality of ribs 45 each of substantially T-shaped in cross section with upper ends sloping downward toward the axis of the cup and with lower ends molded integrally with a wall 46 joining the side walls 40 and 42. In the bottom of this cup are upstanding partitions 48 extending transversely of the interior of the cup in two directions to provide pockets 49. The partitions are molded integrally with the cup and are of the same material. They provide upper edges 51 for a purpose to be described.

The frozen material of the annular mass 11 may be a frozen fruit juice or fruit pulp, soft ice-cream, ice milk or any of the so-called substitutes therefor, usually flavored and often distinctively colored by the flavoring or otherwise. This frozen material may be made of dairy products, fruit or vegetable products. A homogeneous mixture of vegetable oils, sugar, flavoring agent and a stabilizer can be made to produce a frozen product which is extremely smooth and which appears to have been made of cream—a product in which the crystals are so small as to be indiscernible to the taste. A typical formulation of this device may include about 2–14% by weight of vegetable fat, about 12–18% of sugar, about 50–70% of canned fruit juice, and about 0.5–1.5% of a stabilizer, e.g. vegetable gum such as quargum or a combination of edible gums. The density or solidity of the frozen mixture may vary but should be sufficient to permit holding together as an annular mass until it enters the cup and to perform the other functions to be mentioned.

The unfrozen core material of the confection should be of lower density or greater fluidity and should be sufficiently flowable to be displaced upwardly in the annular mass 11 as will be described. This frozen material may be a suitable flavored whipped cream, whipped-cream substitute, meringue, topping, light custard, etc. in color as chosen.

In practice, a pool of the unfrozen material is placed in the bottom of the cup, sometimes after a small fruit morsel has been placed in the extreme bottom. With the cup of FIG. 2 such material may partially or completely fill the pockets 49 and will be supplied until the level is somewhat above the upper edges 51, e.g. the level suggested in FIG. 1. The operator may thus place in the bottom of the cup any unfrozen material of a flavor suggested by the customer, usually a flavor differing from that of the frozen material and usually of a color differing therefrom.

The cup is then held below the freezing machine 10, which is started or actuated to initiate the downflow of the annular mass 11. The outer periphery of this mass is preferably of such diameter as to engage the inner frusto-conical surface 41 of the cup at about the same time the annular lower end 13 engages the surface of the pool of unfrozen material. In many instances it is desirable that such outer periphery engage such inner frusto-conical surface slightly before the annular lower end engages the pool surface, thus insuring a seal between the periphery of the frozen annular mass and the inner surface of the cup. This seal will prevent any rise of the unfrozen material around the outside of the annular mass of frozen material to enter the annular space therearound within the side wall 42 of the cup. In other instances, however, the size relationship may be such as to permit a slight upflow in this latter annular space before a seal is effected between the periphery of the annular mass of frozen material 11 and the inner frusto-conical surface 41 of the cup.

Once the annular lower end 13 of the frozen annular mass 11 engages the surface of the unfrozen pool of material, any relative downward movement of the former will create a hydraulic pressure on the unfrozen material causing it to rise in the central space 12 as suggested in FIG. 3. It should be understood that this relative movement can be effected by holding the cup stationary and permitting the annular mass 11 to move downward therein; by moving the cup upward during the downward movement of the mass 11; by stopping the movement of the mass and raising the cup relative to the lower annular end 13; or, as is usually preferred, by lowering the cup 30 at a rate less than the downward movement of the annular lower end 13 of the annular mass of frozen material 11.

Figure 4:
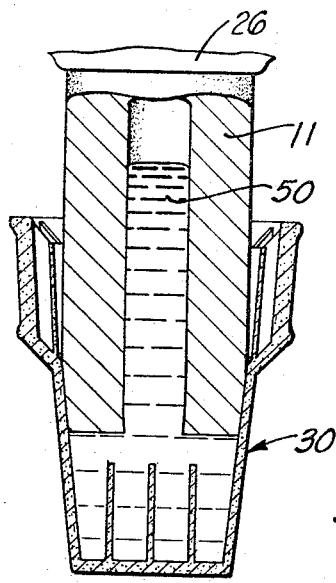
Figure 5:
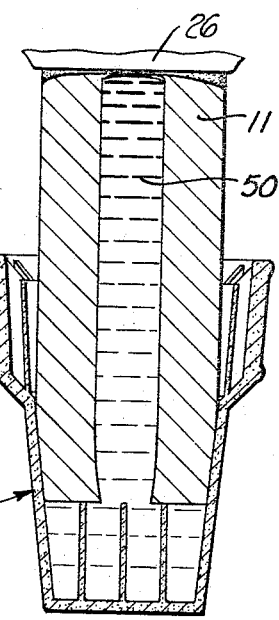

As this relative movement continues the unfrozen material rises further in the central space 12 to form a core terial rises further in the central space 12 to form a core 50 progressive positions being shown in FIG. 3, 4 and 5. In the preferred practice of the invention the amount of unfrozen material initially introduced into the cup is sufficient to substantially fill the central space 12 at the time the annular lower end 13 of the mass reaches the upper edges 51 of the partitions 48. The annular mass of frozen material 11 is then severed, preferably at a position adjacent the exudation orifice of the freezing machine. If desired such serverance can be by twisting or lateral displacement but is preferably effected by a knife or blade 52, shown in FIG. 1 in a retracted position, this blade having a collared arm 53 pivoted to swing on the post 33. If desired such a blade may be of sufficient area to cover the exudation orifice of the machine.

Figure 7:
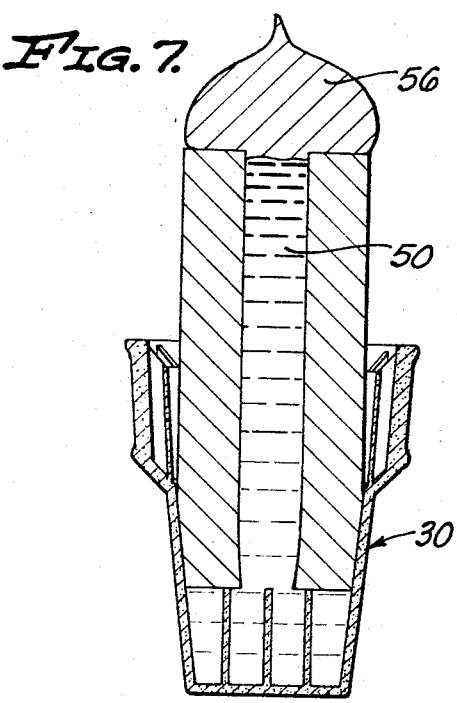
FIG. 7 is a view of the same confection to which has been applied a decorative or tasty cap or crown.
Figure 6:
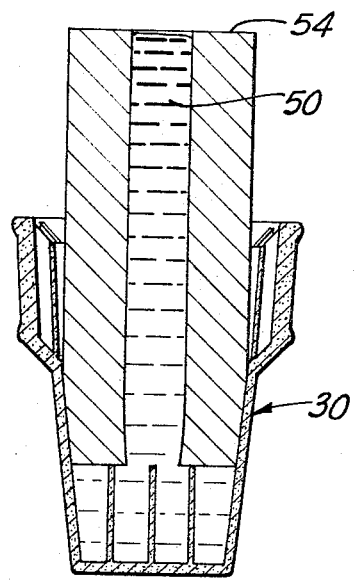
FIG. 6 is a vertical sectional view of the severed confection.

The severed confection is shown in FIG. 6. In the preferred practice the unfrozen material will have risen to substantially fill the central space 12 so that the open top of the confection will show the top 54 of the core 50 at or near such top. The confection can be sold as such or an additional cap or crown 56 of the same or different unfrozen material may be applied as in FIG. 7 using any applying device ranging from a spoon to a pressurized container delivering a fluffy or whipped-cream-like material to form the cap. Alternatively or in addition the confection can be capped with a nut meat or a morsel of fruit.

The confection is eaten while the cup is held in the hand. Each bite normally includes a portion of the frozen material and a portion of the unfrozen material of the core, giving a sundae-like taste. When the upstanding column has been eaten to the lip 43 of the cap later bites will comprise a composite including a portion of the cup material. The last portion of the confection to be consumed will be a taste-lingering composite of the unfrozen material remaining in the pockets 49 and the cup material, thus encouraging complete consumption with no throwaway. The unfrozen material is usually of such consistency as not to be so liquid that it would flow from the pockets 50 when some portion of the latter is exposed.

It will be appreciated that the relative densities and viscosities of the frozen and unfrozen material should be such as to produce the general results desired. The annular mass 11 of frozen material should be of such consistency as to withstand some upward pressure without collapse. It will be appreciated however that as the lower annular end 13 enters the cup and moves downward along the inner frusto-conical surface 41 there may be some compaction thereof resulting either in axial elongation or lateral compaction or both. Such lateral compaction may tend to neck in or partially close the opening at the bottom of the central space 12 as suggested in FIGS. 4, 5 and 6. Such lateral compaction may in some instances continue to such a degree as to close or substantially close the lower end of the central space 12. This should not take place however until the core 50 has risen to the desired level. It will be appreciated also that upward pressure applied by the cup 30 may cause an increase in outer diameter of the annular mass of frozen material 11 between the top of the cup and the point of discharge from the freezing means 10. Such outward swelling may take place to the extent suggested in FIG. 8.

FIG. 8 discloses the confection of the invention as made in a cup 70 of different shape which has no partitions 48 in its lower end and no ribs 45 in its upper end. The interior of the cup 70 is generally frusto-conical throughout its height from the lip 73 thereof to the bottom 78 thereof. The pool of unfrozen material initially inserted in the cup may have a surface at approximately the level A—A. The annular mass of frozen material 11 may be initially of an external diameter suggested by the dotted line 80 but may bow outwardly at 81 and neck inwardly at 82 in accordance with the previous teachings. A cap or crown 86 may be applied as before or may be dispensed with.

It will be apparent that the confections of the invention can be made by mechanically controlling the movement of the cup 30 relative to the lowering annular mass of frozen material 11 or that the effects above mentioned can be obtained by an operator holding the cup in the hand. In the latter instance the cup will be lowered with the exuding annular mass 11 but at a slower rate so as to create the pressure sufficient to force the unfrozen material upward and form the core 50. With standardized densities of frozen and unfrozen material the operator very quickly learns the technique of making the confections.

Various changes and modifications can be made without departing from the spirit of the invention as defined in the appended claims.

I claim:

1. A partially frozen confection comprising:
   (a) a cup made of edible material;
   (b) a small quantity of unfrozen material in the extreme bottom of said cup;
   (c) an annular column of frozen material extending from such unfrozen material in the bottom of said cup upward in said cup to a position substantially above the top of said cup to provide an upstanding column of such frozen material with its lower portion supported by said cup, the lower end of said frozen material being in contact with said small quantity of unfrozen material, said annular column of frozen material having a core space therein open at its upper end and open at its lower end to said small quantity of unfrozen material; and
   (d) a core of said unfrozen material filling said core space and integral with the small quantity of unfrozen material.

2. A partially frozen confection as defined in claim 1 in which said core and said small quantity of unfrozen material are of identical composition and flavor.

3. A partially frozen confection as defined in claim 1 including upstanding partitions in the bottom of said cup formed of the same edible material as the cup and providing pockets containing said small quantity of unfrozen material in the extreme bottom of said cup, the lower end of said annular column of frozen material extending into said cup substantially to the upper edges of said upstanding partitions.

4. A partially frozen confection as defined in claim 1 further comprising a cap of edible material on the top of said annular column of frozen material and extending across the top of said core space in closing relation therewith.

5. A partially frozen confection comprising:
   (a) a cup made of edible material having an impervious bottom wall transverse to the axis of the cup and a frusto-conical side wall rising coaxially from said bottom wall flaring outwardly and upwardly only slightly therefrom;
   (b) an annular column of frozen material in said cup having a top portion protruding upwardly from the top of said cup, said column of frozen material having a bottom surface terminating above said bottom wall to provide a pool space therebetween, said column of frozen material having a central passage therethrough open downwardly on said pool space and open upwardly on the top of said top portion, said column of frozen material having an outer periphery engaging said side wall and forming a seal therewith; and
   (c) a mass of unfrozen material of greater liquidity than said frozen material having integral lower and upper portions respectively substantially filling said pool space and said central passage, said pool space and said lower portion of unfrozen material being of substantially larger cross-sectional area than said central passage, said bottom of said column of frozen material engaging said unfrozen material.

6. A partially frozen confection as defined in claim 5 in which said side wall has a frusto-conical inner surface of a smaller diameter at the top of said pool space than at the top of said frusto-conical inner surface, and in which said annular column is a tubular mass of deformable frozen material having a bottom peripheral portion seated against said frusto-conical inner surface, said top portion of said annular column of frozen material being of an outer diameter substantially the same as the diameter of said top of said frusto-conical inner surface at the level of the latter but of lesser outer diameter near the top of such annular column.

References Cited

UNITED STATES PATENTS

| 1,988,392 | 1/1935 | Niklason | 99—137 |
| 2,046,729 | 7/1936 | Denaro | 99—89 |
| 2,121,564 | 6/1938 | Herron | 99—180 |
| 2,435,906 | 2/1948 | Shapiro | 99—137 X |
| 2,657,649 | 11/1953 | Daanen et al. | 107—54 |
| 2,697,041 | 12/1954 | Graham | 99—89 |
| 2,733,673 | 2/1956 | Vogt | 107—54 |
| 2,929,721 | 3/1960 | Mitzenmacher | 99—137 |
| 3,085,883 | 4/1963 | Collier | 99—137 |

A. LOUIS MONACELL, *Primary Examiner.*

BEATRICE H. STRIZAK, S. E. HEYMAN,
*Assistant Examiners.*